US006090469A

United States Patent [19]

Wadsworth et al.

[11] Patent Number: 6,090,469

[45] Date of Patent: Jul. 18, 2000

[54] MECHANICALLY INTERLOCKED AND THERMALLY FUSED STAPLE FIBER PLEATED AND NON-PLEATED WEBS

[75] Inventors: Larry C. Wadsworth, Knoxville, Tenn.; Oldrich Jirsak, Liberec, Czech Rep.; Peter Ping-yi Tsai, Knoxville, Tenn.

[73] Assignee: The University of Tennessee Research Corporation, Knoxville, Tenn.

[21] Appl. No.: 08/888,749

[22] Filed: Jul. 7, 1997

Related U.S. Application Data

[63] Continuation-in-part of application No. 08/426,031, Apr. 21, 1995, Pat. No. 5,955,174.

[51] Int. Cl.[7] .......... B32B 3/28

[52] U.S. Cl. .......... 428/181; 428/182; 442/357; 442/360; 204/164

[58] Field of Search .......... 428/181, 182, 428/186, 113, 198; 442/357, 360, 381, 400, 401; 204/164, 165

[56] References Cited

U.S. PATENT DOCUMENTS

| | | | |
|---|---|---|---|
| Re. 32,171 | 6/1986 | van Turnhout | 55/155 |
| 4,576,853 | 3/1986 | Vaughn et al. | 428/181 |
| 4,961,974 | 10/1990 | Jones | 442/360 X |
| 5,098,767 | 3/1992 | Linnersten | 428/181 X |
| 5,167,740 | 12/1992 | Michaelis et al. | 428/181 X |
| 5,350,620 | 9/1994 | Sundet et al. | 428/181 X |
| 5,397,632 | 3/1995 | Murphy et al. | 428/181 X |
| 5,401,446 | 3/1995 | Tsai et al. | 264/22 |
| 5,686,050 | 11/1997 | Wadsworth et al. | 422/186.05 |
| 5,955,174 | 9/1999 | Wadsworth et al. | 428/181 |

*Primary Examiner*—Daniel Zirker
*Attorney, Agent, or Firm*—Duane, Morris & Heckscher LLP

[57] ABSTRACT

A staple fiber web is disclosed which contains pleats having staple fibers which are commingled with staple fibers from adjoining pleats. The commingling permits denser packing of pleats on the web and increases filtering efficiency and stability of the web. Methods of manufacturing the pleated staple fiber web are disclosed.

23 Claims, 12 Drawing Sheets

MECHANICALLY INTERLOCKED AND THERMALLY FUSED STAPLE FIBER PLEATED AND NON-PLEATED WEBS

This application is a continuation-in-part of U.S. application Ser. No. 08/426,031, filed Apr. 21, 1995, U.S. Pat. No. 5,955,174, which is incorporated herein by reference.

FIELD OF THE INVENTION

The invention pertains to the field of webs comprising a layer of a staple fiber web, alone or with a layer of a nonwoven web, which webs are typically employed as filters in heating and cooling systems, and in High Efficiency Particulate Air (HEPA) filters.

BACKGROUND OF THE INVENTION

Staple fiber webs, both single layer and composite, both pleated and unpleated, are known. Such webs are useful for a variety of purposes, such as for roofing materials, filters, insulating materials, and in apparel.

As filters in heating and cooling systems, and in some HEPA filter applications, staple fiber webs have been used for many years. The fibrous filters trap small airborne dust particles and remove the particles from a stream of air.

Fibrous filters typically function by mechanically trapping the particles. Very small particles, however, pass through the filters unless the fibers of the filter are very fine and closely packed. Such filters have the disadvantage of producing a high pressure drop, that is of creating a high resistance to air flow, through the filter.

Pleating the filters increases the filtering efficiency of the filters, without producing as high a pressure drop as is caused by more densely packing the fibers. Several disadvantages remain, however, with pleated filters. The pleating of such pleated filters tends to be dimensionally unstable unless the pleats are anchored to a supporting nonwoven or scrim. Moreover, it is difficult, if even possible, to obtain pleating which is extremely close. Therefore, much of the potential benefit of pleating is not realized.

The present invention overcomes the disadvantages of present day pleated staple fiber filters. The pleats of the webs of the invention are internally stable and do not require additional support and the pleats may be produced and maintained in extremely tight conformation.

SUMMARY OF THE INVENTION

In one embodiment, the invention is a pleated web comprising a layer of a staple fiber web. The web contains a series of pleats wherein staple fibers from the pleats are thermally fused and/or interlocked with staple fibers of adjacent pleats. The web of the invention is particularly well suited for use as a filter, such as in heating or cooling systems.

Typically, although not necessarily, the pleated web is a composite web comprising one or more layers of a staple fiber web and one or more layers of a nonwoven web which may likewise be pleated or may be unpleated. The pleated web may further comprise a support nonwoven web or scrim.

The association of staple fibers from adjacent pleats permits the formation of a pleated web in which the pleats are more stabilized and may be closer together than is feasible in webs in which staple fibers from adjacent pleats are not entangled and/or thermally fused. The close packing of the pleats provides for increased filtration capability. Additionally, in many instances, the close packing of the pleats obviates the need for a supporting base nonwoven or scrim as the pleats of the webs of the invention are stable even without additional support.

Interlocking (entanglement) and/or thermal fusing of the staple fibers of adjacent pleats may be obtained by any suitable method. In a preferred method, the entanglement and/or thermal fusion is achieved by means of a static electricity charge on the surface of the staple fibers of the staple fiber web. The static electricity charge serves to bring the staple fibers of adjacent pleats closer together and to maintain the staple fibers in close proximity during web formation so that the fibers become fused and/or Interlocked in an entangled configuration during subsequent thermal stabilization of the pleated web.

The static electricity charge may or may not remain on the surface of the staple fibers following thermal stabilization. Whether the static electricity remains on the surface of the staple fibers is immaterial to the structure of the final pleated web as staple fibers from adjoining pleats remain commingled following stabilization even though the static electricity is no longer present. If desired, the pleated web of the invention may be treated to impart a permanent electrostatic charge to the surface of the web, such as by the methods described in U.S. Pat. Nos. Re. 32,171 and 5,401,446, each of which is incorporated herein by reference.

In another embodiment, the invention is a composite web comprising a first layer of a staple fiber web and a second layer of a nonwoven web wherein the staple fibers are statically charged. The composite web of this embodiment may be pleated or may be left unpleated. The pleats may encompass the layer of staple fibers as well as the layer of a nonwoven web, in which case the pleats are referred to as "macropleats". Alternatively, the pleats may encompass only the layer of staple fibers, in which case the pleats are referred to as "micropleats". Additionally, a composite web may comprise both macropleats and micropleats, that is macropleats may be formed with an unpleated staple fiber web or with a micropleated web.

The static electricity charge of the fibers serves to position the staple fibers in such a way that subsequently introduced pleats, whether they be macropleats or micropleats, are brought and maintained closer together than would be the case if the staple fibers were not static electrically charged.

In another embodiment, the invention is a process for the manufacture of a stabilized pleated web. The process comprises introducing a static electrical charge in or on the fibers of a staple fiber web, introducing pleats in the web, and heat fixing the pleated composite web to form a stabilized pleated web. The process may additionally comprise laminating the staple fiber web to a nonwoven web to produce a composite web. The pleats of the web may involve only the staple fiber web, in which case they are referred to as micropleats. Alternatively, or in addition to the micropleats, the pleats of the web may involve the staple fiber web a and the nonwoven web layers, in which case they are referred to as macropleats. The process of the invention results in the formation of a pleated web wherein stable fibers from a pleat, whether they are macropleats and/or micropleats, are intertangled or are thermally fused together with staple fibers from an adjacent pleat.

Another embodiment of the invention is a method for increasing the density of pleating in a staple fiber web. The web may be a single layer web or may be a composite web comprising, in addition to the staple fiber web layer, a nonwoven web layer.

In accordance with this method of the invention, a static electricity charge is formed on the surface of staple fibers of a staple fiber web. The formation of the static electricity charge is typically at the time of formation of the staple fiber web, but may be at any time during manufacture of the pleated web, prior to subsequent heat stabilization. Pleats, which may be macropleats and/or micropleats, are introduced into the web, while maintaining the static electricity charge or prior to adding the static electricity charge. The pleats are then heat stabilized, typically in an oven.

The pleats of the resultant pleated web contain staple fibers which are joined, by entanglement or fusion, to staple fibers of neighboring pleats. This produces a web having pleats which are more closely packed than are webs lacking staple fiber commingled neighboring pleats.

Owing to the commingling of the pleats, the pleated web of the invention, and pleated webs formed by the methods of the invention, are more stable than comparable present day pleated webs, and typically do riot require supporting nonwovens or scrims. The filtering efficiency of the pleated webs of the invention is comparable to or higher than prior art pleated webs, even without supporting scrims, and the high filtering efficiency is achieved even though pressure drop is maintained at a low level.

DETAILED DESCRIPTION OF THE INVENTION

Figure 1:
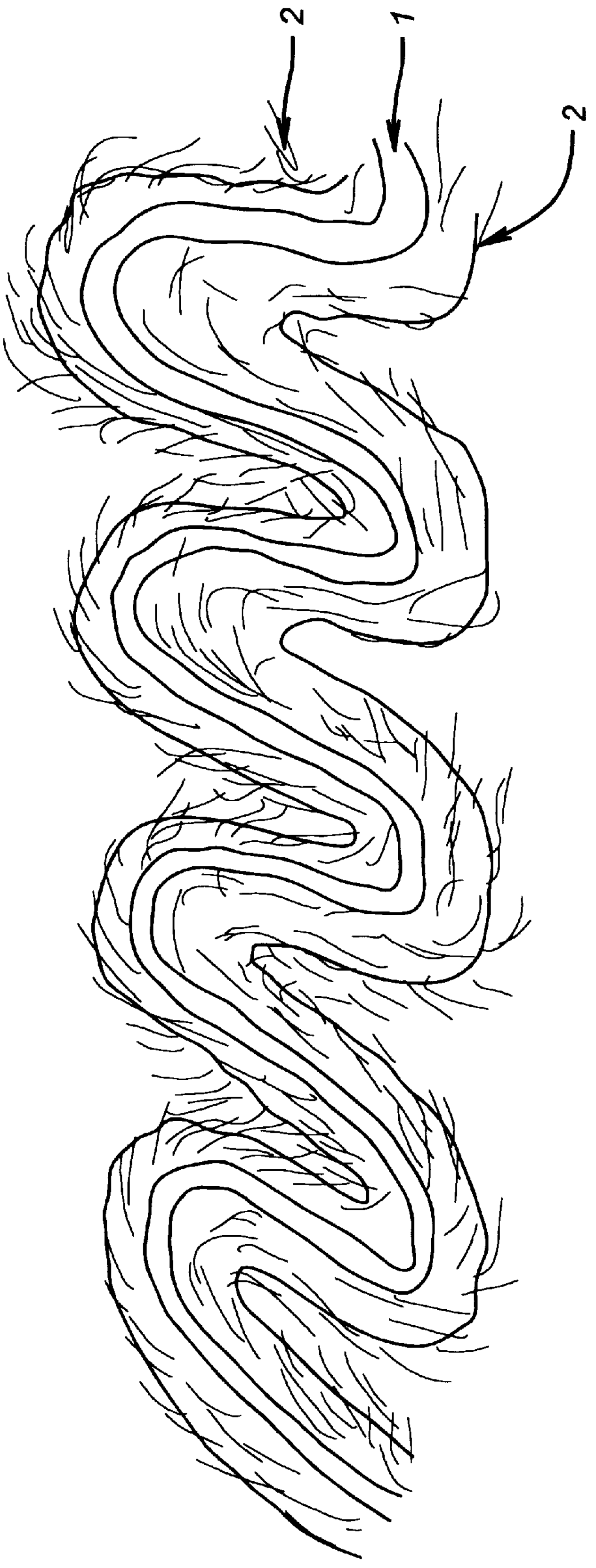
FIG. 1 shows a diagrammatic representation of a pleated (macropleated) 3 layer composite web of the invention comprising an innermost layer of a meltblown nonwoven polypropylene web and top and bottom layers of a carded staple fiber web of polypropylene blended with bi-component polypropylene/polyethylene core/sheath binder fibers.

According to a first embodiment, the invention is a pleated web comprising one or more layers of a staple fiber web. The pleated web may be a multilayered composite web which comprises one or more layers of a staple fiber web and one or more layers of a nonwoven web. At least one of the surface layers of the composite web is a layer of a staple fiber web.

In accordance with the invention, staple fibers from pleats in the pleated web are joined with staple fibers from adjacent pleats. The staple fibers generally are commingled by being mechanically entangled or by being thermally fused with staple fibers from the neighboring pleat.

The commingling of the staple fibers is accomplished by any means which will result in the mechanical interlocking or fusion of staple fibers from adjacent pleats. In a preferred embodiment, the commingling is achieved by maintaining a static electricity charge on the surface of the staple fibers which, when the web is pleated, maintains the pleats in extremely close proximity during subsequent heat stabilization to promote the entanglement and to permit the fusion of fibers from adjacent pleats.

The staple fibers for the web of the invention may be of any material or composition, the fibers of which are capable of retaining a static electricity charge. Non-limiting examples of suitable staple fibers include synthetic polymeric materials such as polypropylene (PP), polyethylene terephthalate (PET), polyethylene (PE), polybutylene terephthalate (PBT), polycylohexyldimethylene terephthalate (PCT), polycarbonates, and polychlorotrifluoroethylene (PCTFE), poly[4-methylpentene-1] (TPX), natural materials such as cotton, wool, cellulosic fibers, including synthetic cellulosic fibers, and wood tissue, or blends.

In a preferred embodiment, the staple fiber web is a carded staple fiber web of polypropylene blended with bi-component polypropylene/polyethylene core/sheath bi-component binder fibers.

The staple fiber web may be made by any process suitable for making a staple fiber web. The staple fiber web is preferably a carded web, although non-carded webs are also suitable for the stable fiber web of the pleated web of the invention.

The nonwoven web may of any of material suitable for making a nonwoven web. For example, the nonwoven web may be of any of the above materials suitable for making the staple fiber web. Additionally, the nonwoven web may be made by any process suitable for making a nonwoven web, such as meltblowing or spunbonding.

In a preferred embodiment, the nonwoven web of the composite of the invention is a meltblown polypropylene fabric.

In the following discussion, the terms "pleated web" or "composite web" refer both to a pleated web having a staple fiber web as the sole web layer and to a composite pleated web having a staple fiber web and a nonwoven web component layers. The following disclosure, although stated in terms of a composite web or a multilayered composite web, applies equally to a single layer pleated staple fiber web, except where the context necessarily is restricted to a composite web, such as when referring to macropleats.

Figure 3:
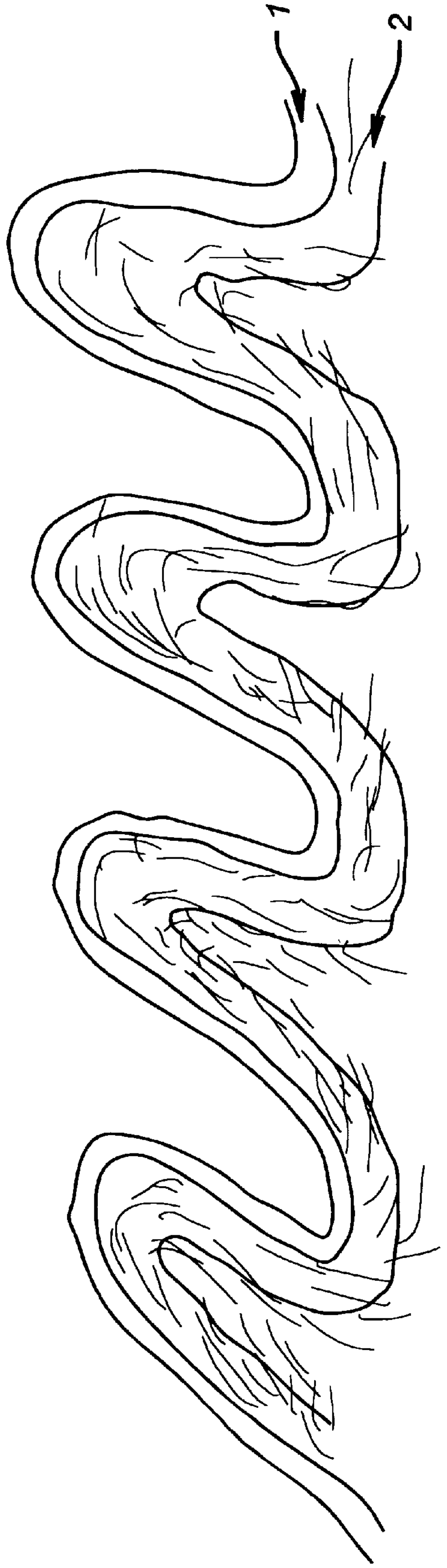
FIG. 3 diagrammatically shows a macropleated 2 layer composite web of the invention comprising a first layer of a nonwoven web and a second layer of a carded non-pleated (non-micropleated) staple fiber web.

The pleats of the multilayered composite web may be macropleats, that is involving more than one layer of the composite web. Such a composite web is illustrated in FIGS. 1 and 3, which show a three layer and a two layer composite web of the invention, respectively. In the composite webs shown in each of the FIGS. 1 and 3, a nonwoven web 1 is layered with one or more layers of a carded staple fiber web 2. The composite web is macropleated, both the staple fiber web layer or layers and the nonwoven web layer are included in the pleats.

The pleats of the composite web are maintained in close proximity to each other by the commingling of staple fiber web fibers from adjacent pleats. Such commingling is generally by mechanical entanglement and/or by fusion, such as by thermal fusion, of fibers from neighboring pleats.

In a preferred embodiment, staple fibers from adjacent pleats are entangled and thermally fused with one another. An individual staple fiber from one pleat may be either entangled or fused with staple fibers from an adjacent pleat, or a fiber may be both entangled and thermally fused. Of course some of the individual staple fibers of a pleat remain neither entangled nor fused with fibers from an adjacent pleat. It is suitable for the composite web of the invention if a sufficient number of staple fibers from neighboring pleats are commingled to maintain the pleats in closer proximity than would be the case if the adjacent pleat staple fibers were not commingled.

Figure 2:
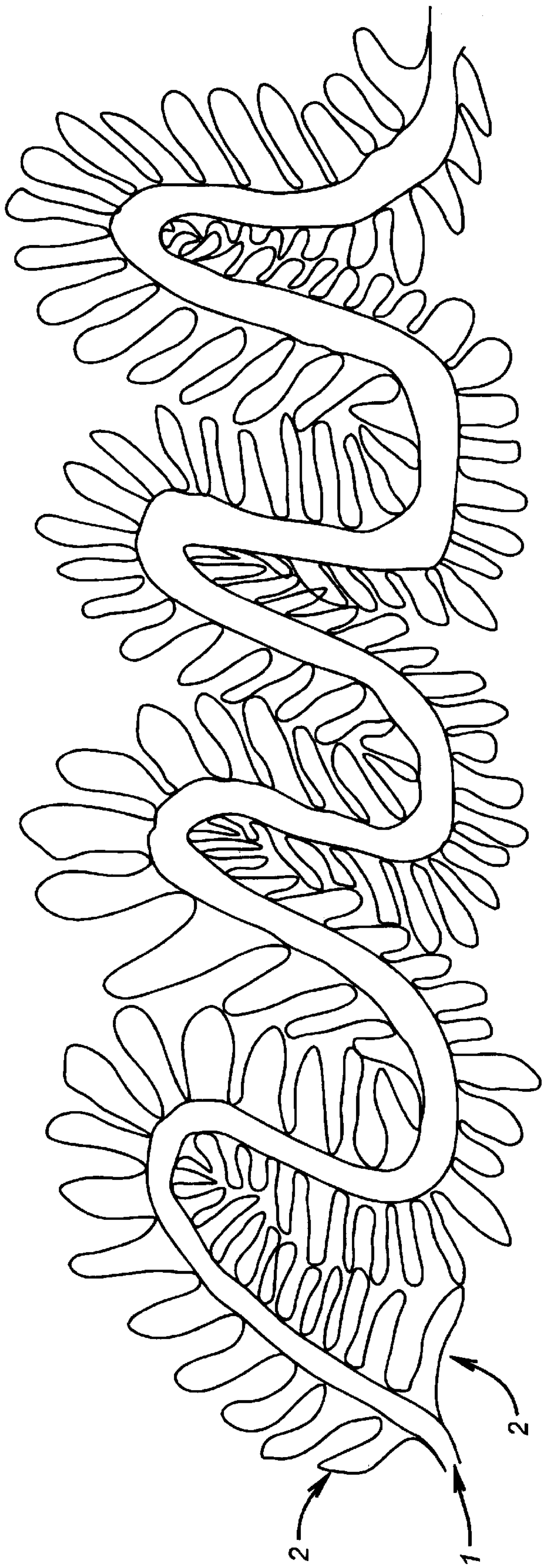
FIG. 2 diagrammatically shows a composite web of the invention similar to that of FIG. 1, except that the top and bottom layers of staple fiber web are micropleated.
Figure 4:
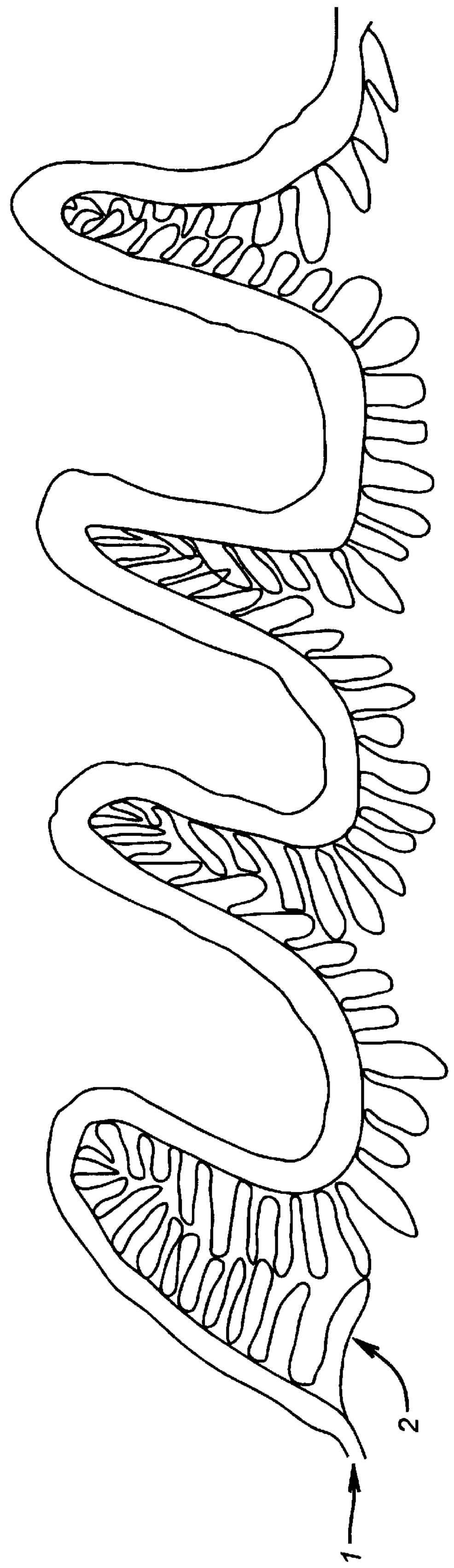
FIG. 4 diagrammatically shows a composite web of the invention similar to that of FIG. 3, except that the staple fiber web is pleated (micropleated).
Figure 5:
FIG. 5 diagrammatically shows a composite web of the invention similar to that of FIG. 1, except that a support, such as a nonwoven or a scrim, is attached to the pleats of a staple fiber web layer.
Figure 6:
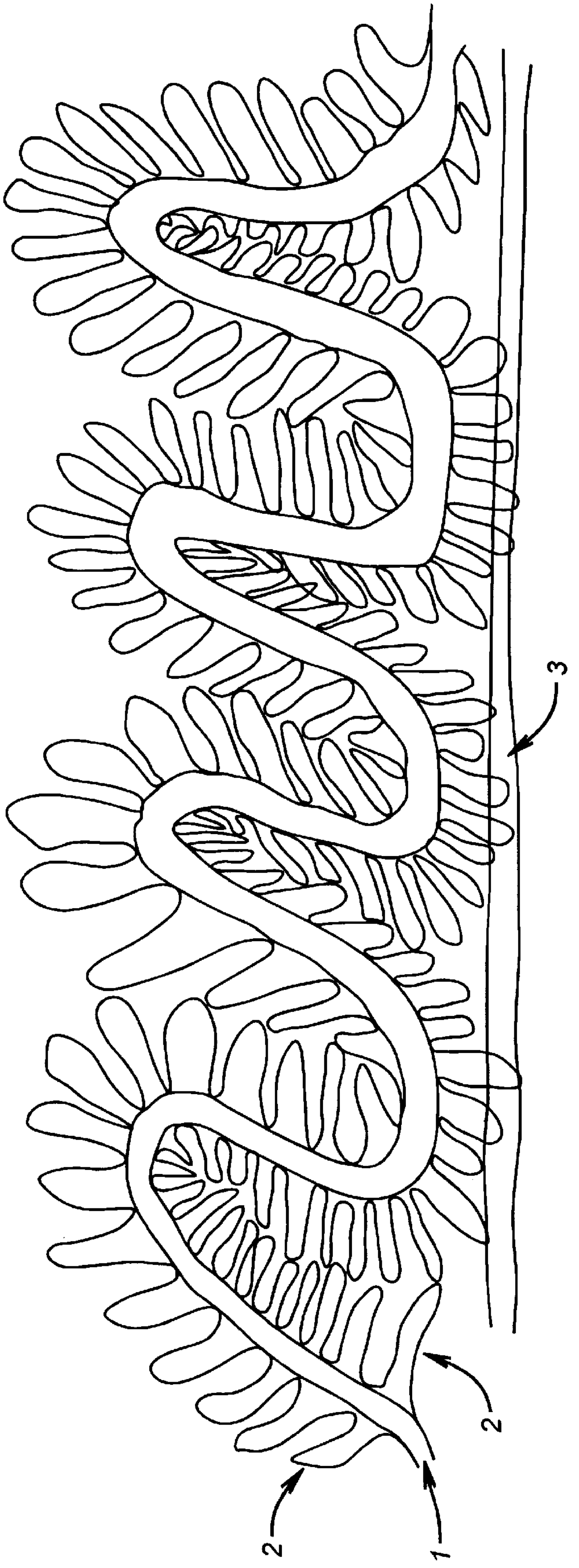
FIG. 6 diagrammatically shows a composite web of the invention similar to that of FIG. 2, except that a support, such as a nonwoven or a scrim, is attached to the pleats of a staple fiber web layer.
Figure 7:
FIG. 7 diagrammatically shows a composite web of the invention similar to that of FIG. 3, except that a support, such as a nonwoven or a scrim, is attached to the pleats of the staple fiber web layer.
Figure 8:
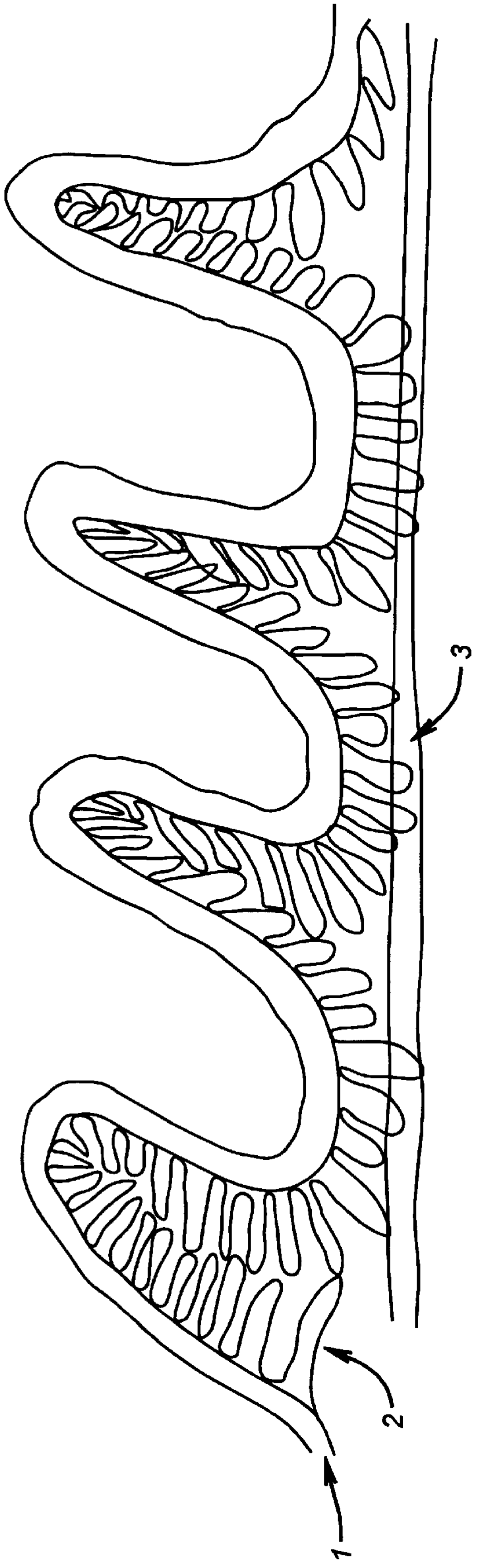
FIG. 8 diagrammatically shows a composite web of the invention similar to that of FIG. 4, except that a support, such as a nonwoven or a scrim, is attached to the pleats of a staple fiber web layer.

Alternatively to, or in combination with, the macropleats, the pleats of the composite web of the invention may contain micropleats, that is involving only the staple fiber web layer. FIGS. 2 and 4 illustrate three and two layer composite webs which are similar to those of FIGS. 1 and 3, except that the staple fiber web layers 2 are micropleated. The pleated composite web containing more than one staple fiber layer may comprise a micropleated layer and a non-micropleated layer (not shown). As with the macropleats described above, some of the staple fibers from a micropleat are commingled with staple fibers from adjacent micropleats on the same and/or adjacent macropleats.

The staple fiber and nonwoven component layers of the composites of the invention may be joined as laminated structures by any suitable means. For example, the layers may be attached by heat fusion of a fiber having a lower melting point than the melting point of the fibers of the remaining webs. The fusion of the layers may be at discrete focal points.

Such heat fusion may be accomplished by the use of bi-component core/sheath fibers as a blend with the staple fiber component. Another type of core/sheath bi-component fiber that may be used is a fiber having a poly[ethylene terephthalate] (PET) polyester core and a lower melting polyester copolymer or polypropylene (PP) and polyethylene (PE) copolymer as the sheath. The bi-component fibers of the above polymers and morphologies may be used in side-by-side and other configurations. Low melting temperature homopolymers or PP/PE copolymers, PET/PE copolymers, and other polyester copolymers are additional examples of low melting temperature binder fibers that may be used. In one preferred embodiment, a bi-component fiber having a sheath of polyethylene, for lower melting temperature, and a core of polypropylene, for better mechanical properties, may be used.

Pleats, both macropleats and micropleats, may be introduced into the composite web of the invention by any means for pleating fabrics. Examples of suitable means for introducing pleats include the use of vibrating and rotating perpendicular lappers.

Before pleating, the composite web of the invention is preferably treated to promote the commingling of staple fibers from adjacent pleats. In a preferred embodiment, the composite is treated to impart static electricity on the surface of the staple fibers.

This electrical activation of the staple fibers may be accomplished by any means which will introduce a static electric charge on the staple fibers. Typically, the staple fibers are electrically activated during the fiber formation process, such as by the mechanical action of carding or by other web formation processes such as air laying or co-rotating dual rollers with metallic teeth. The mechanical action of web forming, in which staple fibers such as polypropylene (PP) or polyethylene (PE) are rubbed against metallic wire or other metal surfaces, exposed to the frictional forces of high velocity air such as in the air laying process, rubbed against PP fibers or other types of binder fiber components such as PE, nylon or polyester fibers, rubbed against hydrophilic and relatively electropositive fibers such as cotton, viscose rayon or wool that may be blended with hydrophobic and more electronegative fibers such as PP or PE, or rubbed against fibers with different fiber finishes, produces static electric charges on the surface of the staple fibers.

In addition to, or as an alternative to, producing a static electricity charge on the surface of the staple fibers during the fiber formation process, the static electricity charge may be added after the fibers are formed or after the staple fiber web is formed. Any added static electricity charge should be introduced before final heat stabilization of the finished pleated web.

The static charges on the staple fibers may be predominately negative or positive static charges, or may be more equal mixtures of both positive and negative charges on different fibers or even on the same fibers. Each of these alternatives of static charge is suitable for electrically activating the staple fibers of the composite of the invention.

This electrical activation during web formation helps to bring the fibers in adjacent macropleats, and micropleats, closer together. During subsequent heat stabilization of the composite web, the pleats are held together long enough for both thermal fusing and entanglements of fibers between adjacent pleats to occur, which holds the pleats of the composites in place, thereby rendering the composite web structure dimensionally stable and self-supporting.

The pattern of static charge on the surface of the staple fibers is immaterial. That is, any static charge pattern is suitable for the composite web of the invention. Without wishing to be bound by theory, the inventors believe that the immateriality of the static charge pattern is explained as follows.

If the staple fibers in the web are predominately negatively or predominately positively charged, the fibers repel each other and spread out upon being brought closer together. This increases the free spaces between fibers and facilitates the intermeshing of fibers between adjacent pleats when the pleats are brought closer together.

On the other hand, if different polarities are present on fibers between pleats, the opposing charges are attractive and bring the fibers between adjacent pleats closer together. This improves intermingling and interlocking of fibers and reduces distance between fibers until thermal fusing occurs in the oven. Then the fibers between the pleats are permanently thermally fused and mechanically interlocked together.

If a composite web is to contain both micropleats and macropleats, typically a two-stage pleating process is employed. During the first stage, micropleats are introduced into a staple fiber web having a static electricity charge. The pleats are then stabilized in an oven, which may remove some or all of the static charge on the surface of the staple fibers. Additional static electricity charge should be introduced to the surface of the staple fibers for subsequent formation of macropleats.

Alternatively, micropleating and macropleating may be performed in an in-line process whereby a composite web is micropleated, followed by macropleating. The heat stabilization occurs after both sets of pleats have been introduced. In this way, there is no loss of static electricity charge between pleating steps.

The static electric charge may or may not remain on the staple fibers following thermal stabilization of the final product composite web in the oven. Whether the static electricity charge on the staple fibers survives the heat treatment is immaterial. It is only important that the static electricity charge hold the fibers on adjacent pleats close together for a time sufficient for both thermal fusing and entanglement of fibers between adjacent pleats to occur. Accordingly, the final composite web of the invention may or may not have a residual static electricity charge on the surface of its staple fiber web.

If desired, the single layer or composite pleated web of the invention may be treated, such as by application of an electrostatic charge on the surface of the pleated web, as described in Tsai and Wadsworth, U.S. Pat. No. 5,401,446, incorporated herein by reference.

In contrast to prior art composite webs, the pleats of the composite pleated webs of the invention, comprising mechanically interlocked and/or thermally fused staple fibers between adjacent pleats, are stable and do not require a support nonwoven or scrim. However, if desired, the composite web of the invention may be attached to or may comprise a flat nonwoven such as a needlepunched or spunbond nonwoven or an open mesh woven or nonwoven scrim. See FIGS. 5 to 8, which illustrate composite webs of the invention which are similar to those illustrated in FIGS. 1 to 4, respectively, except for the presence of a supporting nonwoven or scrim 3.

In another embodiment, the invention is a composite web comprising a first layer of a staple fiber web and a second layer of a nonwoven web wherein the staple fibers are static electrically charged. The composite web of this embodiment may be useful as a precursor web for the stabilized pleated composite web described above.

According to this embodiment, the "precursor" composite web has not been thermally stabilized, which may remove the static electricity charge on the surface of the staple fibers. Thus, the static electricity charge remains on the surface of the staple fibers of the precursor web. The staple fiber web and the nonwoven web constituting the composite web may be as described above. The static electrical charging is as described above. The composite web may be pleated or unpleated.

In another embodiment the invention is a method for producing the composite or precursor composite web of the invention.

According to the method of the invention, a staple fiber web is formed by a method which imparts an electrostatic charge to the surface of the staple fibers. For example, the staple fiber web may be formed by carding, which is preferred if the web is to comprise micropleats, by air laying, or by application from wire covered co-rotating dual rollers.

If it is desired to form micropleats from the staple fiber web, care should be taken not to dissipate all of the static electrical charges during heating fixation of the fibers in the micropleats before laminating the micropleats to other nonwovens and forming macropleats of the composite structure. However, if static electrical charge produced from processing the fibers to produce webs are essentially eliminated by the first micropleating and heating stage, then additional static electric charges may be added.

The addition of static electric charges may be, for example, as described in U.S. Pat. No. 5,401,446. Additional static electricity charge may be obtained by passing the micropleated staple fiber web between a pair of DC charge bars of opposite polarities using emitter pins or wires or between one DC charging bar of the desired polarity and a grounded metal roller or plate. A low order corona treatment is sufficient, and relatively low DC voltages are required compared to the maximum corona treatment required to produce more permanent electret fibers.

After the micropleats and/or macropleats of the composites are introduced, the composites are transported, such as by travel by conveyor belt or by other suitable means, to a stabilizing oven. In the oven the micropleats and the macropleats are heat fixed (thermally stabilized).

The heat fixation according to the method of the invention contrasts with that of prior art methods. Previously, heat fixation consisted of thermally fusing together homopolymer fibers or blends of staple fibers with binder fibers in non-pleated or micropleated staple fiber webs, or in adhering a staple fiber blend containing binder fibers to a flat nonwoven such as a needlepunched or spunbond nonwoven or to an open mesh woven or nonwoven scrim. Typically, this involves application of an adhesive or pre-formed nonwoven fabric, usually heat activated, between a macropleated composite structure and a base web. The fusing of the heat sensitive adhesive or nonwoven to the composite web served to stabilize the macropleated structure.

In accordance with the present invention, although these additional adhesives or thermally activated nonwovens may also optionally be used to provide even greater support to the macropleated structures of the invention, such adhesives and heat fusible nonwovens, or flat base nonwovens and scrims, are not typically required for stabilization. Heat stabilization in accordance with the present invention stabilizes the entanglement of and heat fuses the fibers from adjacent pleats.

In accordance with a preferred embodiment of the present invention, the staple fiber web layer is attached to a nonwoven web layer to form the layered composite web of the invention. As described above, the attachment of the layers may be by any means suitable for attaching a staple fiber web layer to a nonwoven web layer. Typically, such attachment is by heat fusion of the layers.

A preferred method of attachment is by heat fusion of a relatively low melting point fiber of one layer to the fibers of the other layer. The fusion of such "binder fibers", for example in the staple fiber web, typically bonds fibers within the staple fiber web itself, between pleats, and between layers of the composite web.

A most preferred method of attachment is by heat fusing a bi-component fiber of the staple or nonwoven layer, such as a fiber having a PET core surrounded by a PP or PE sheath, to the fibers of the other layer or layers of the composite web.

During the heat fusion process in the oven, the micropleats and macropleats are heat fixed. The static electrical charges hold the staple fibers in adjacent macropleats in an interlocked position (much like VELCRO™) until thermal fusing of the binder fiber components of the staple fibers locks them together in fused and entangled states.

The heat in the oven also serves to decompose and volatilize fiber finishes on the staple fiber webs, and thereby minimizes the detrimental effect that fiber finishes may have on the ability to electrostatically charge the fibers and also minimizes the tendency of fiber finishes to accelerate charge decay, bleeding of the charge, with time. Such finishes include those containing a quaternary amine, alcohol, carboxylic acid or other functional groups.

If desired, to increase the likelihood that intermingling of the staple fiber webs will occur, either the thickness (by changing the staple fiber web weight or by "micropleating" the staple fiber web) or the number of pleats, or both, may be increased. This will enhance the tendency of the static electrostatic charges to bring the staple fibers of adjacent macropleats even closer together and even more entangled until the heat in the oven heat fixes the pleats in place. The pleats are then held in place by the resulting mechanical interlocking and/or thermal fusing of the fibers.

As the thickness of the web of carded staple fibers increases, the fiber interaction which helps to hold the "micro" and "macro" pleats in place also increases. Increasing web thickness, however, must be balanced against an accompanying increase in pressure drop. Increasing the number and the height of the macropleats tends to decrease pressure drop. However, if the number of pleats per unit of fabric length is increased to the point that the composite becomes overly dense, this may result in an increase in pressure drop.

The invention is illustrated in the following non-limiting examples.

EXAMPLE 1

Figure 9:
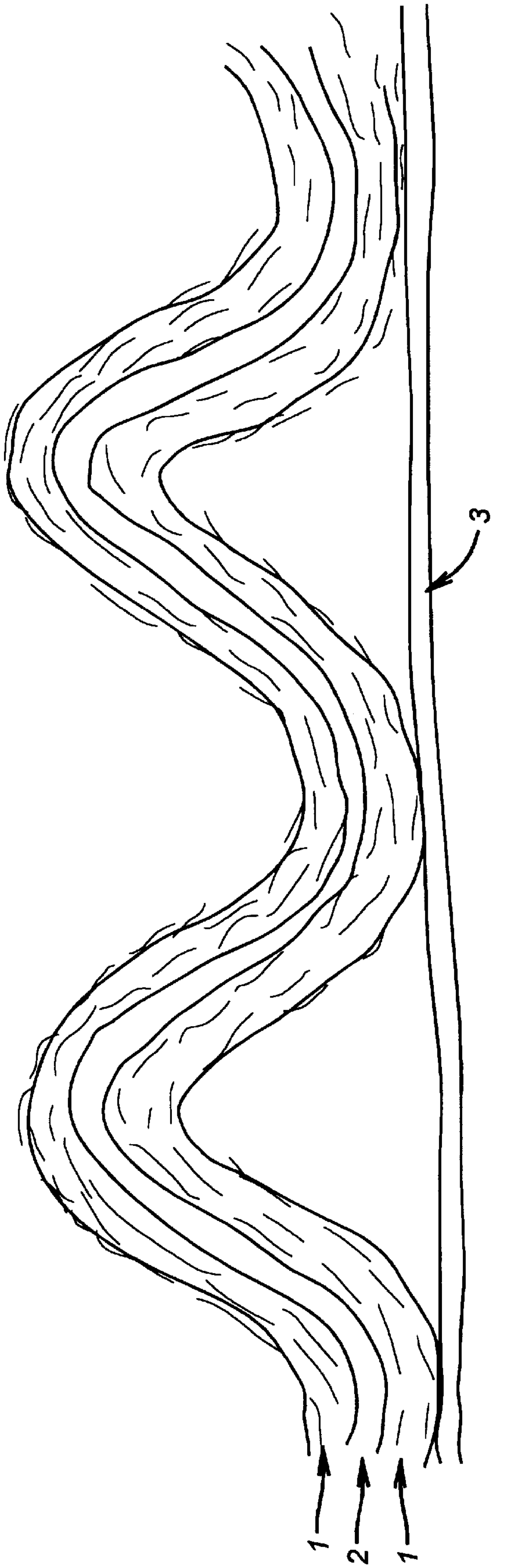
FIG. 9 diagrammatically shows a 3 layer pleated composite web, made not in accordance with the invention, which comprises an inner layer of a nonwoven web and top and bottom layers of carded staple fibers, which may or may not be micropleated. The bottom staple fiber web is anchored to a supporting nonwoven fabric or scrim.
Figure 10:
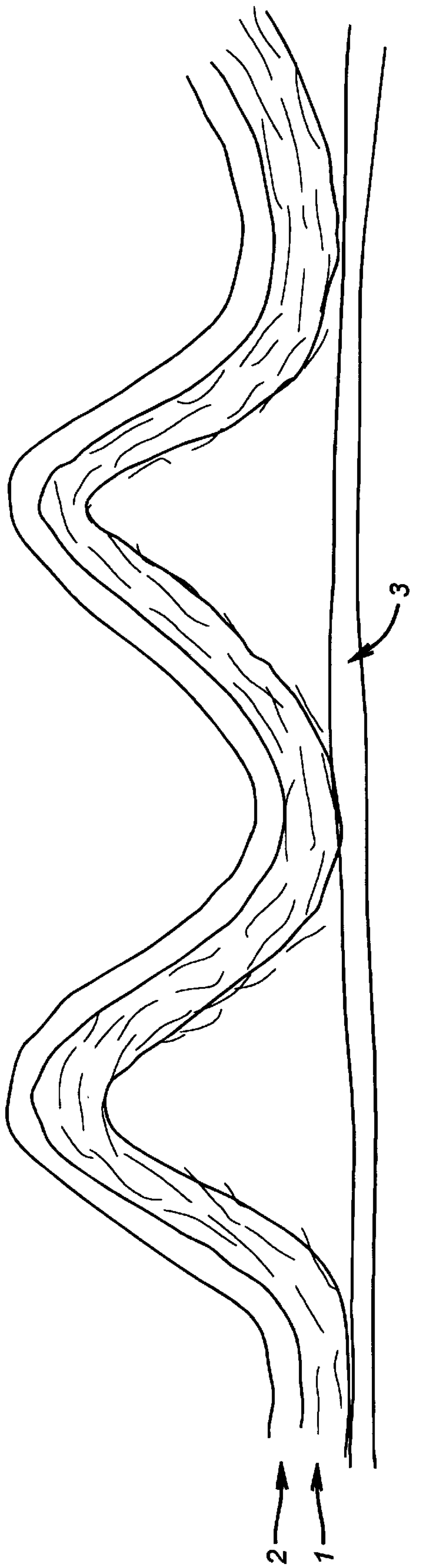
FIG. 10 diagrammatically shows a 2 layer pleated composite web, made not in accordance with the invention, which comprises an inner layer of a nonwoven web and top and bottom layers of carded staple fibers. The staple fiber web, which may or may not be micropleated, is anchored to a supporting nonwoven fabric or scrim.
Figure 11:
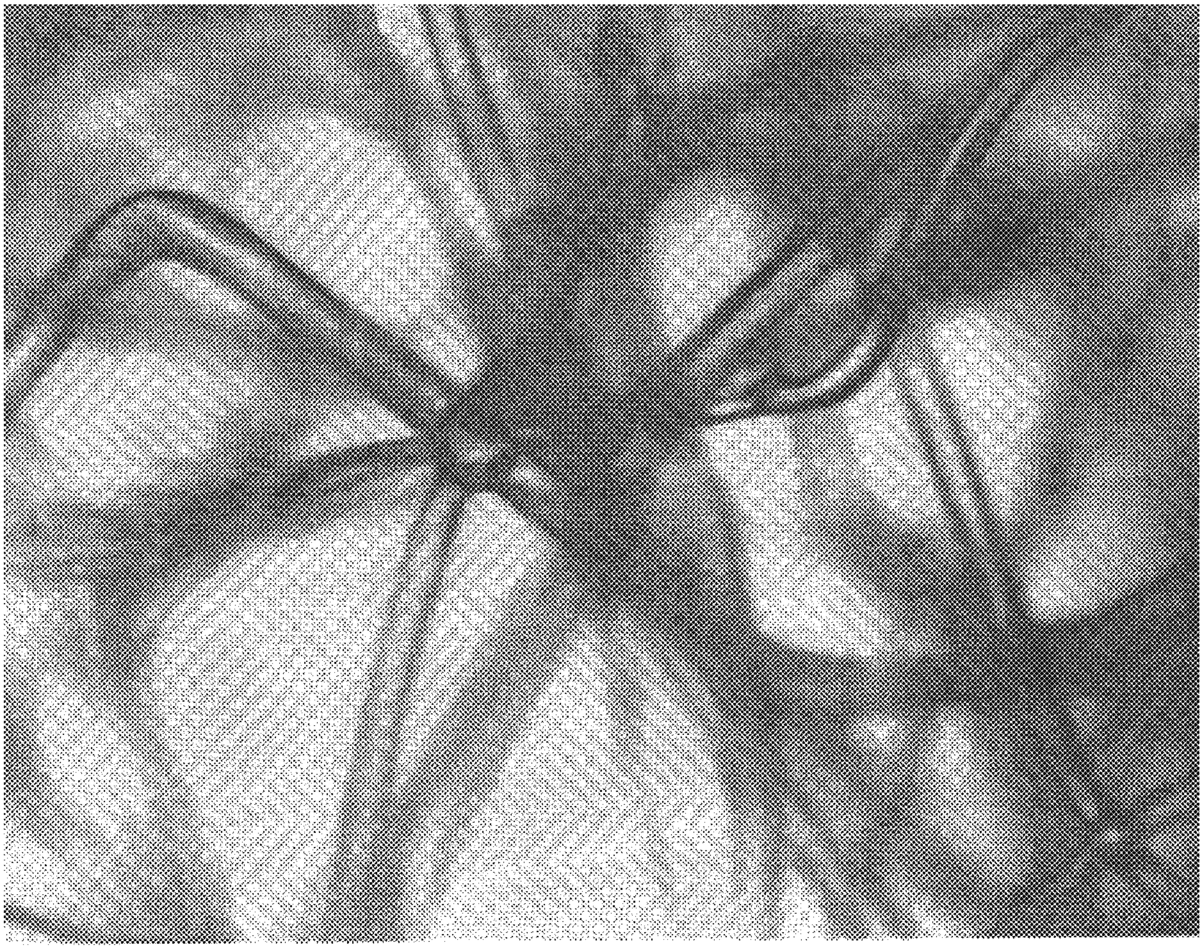
FIG. 11 shows a scanning electron photomicrograph (SEM) of intermeshed stable fibers from adjacent pleats of the composite web of FIG. 1. Thermal fusion of fibers is apparent.
Figure 12:
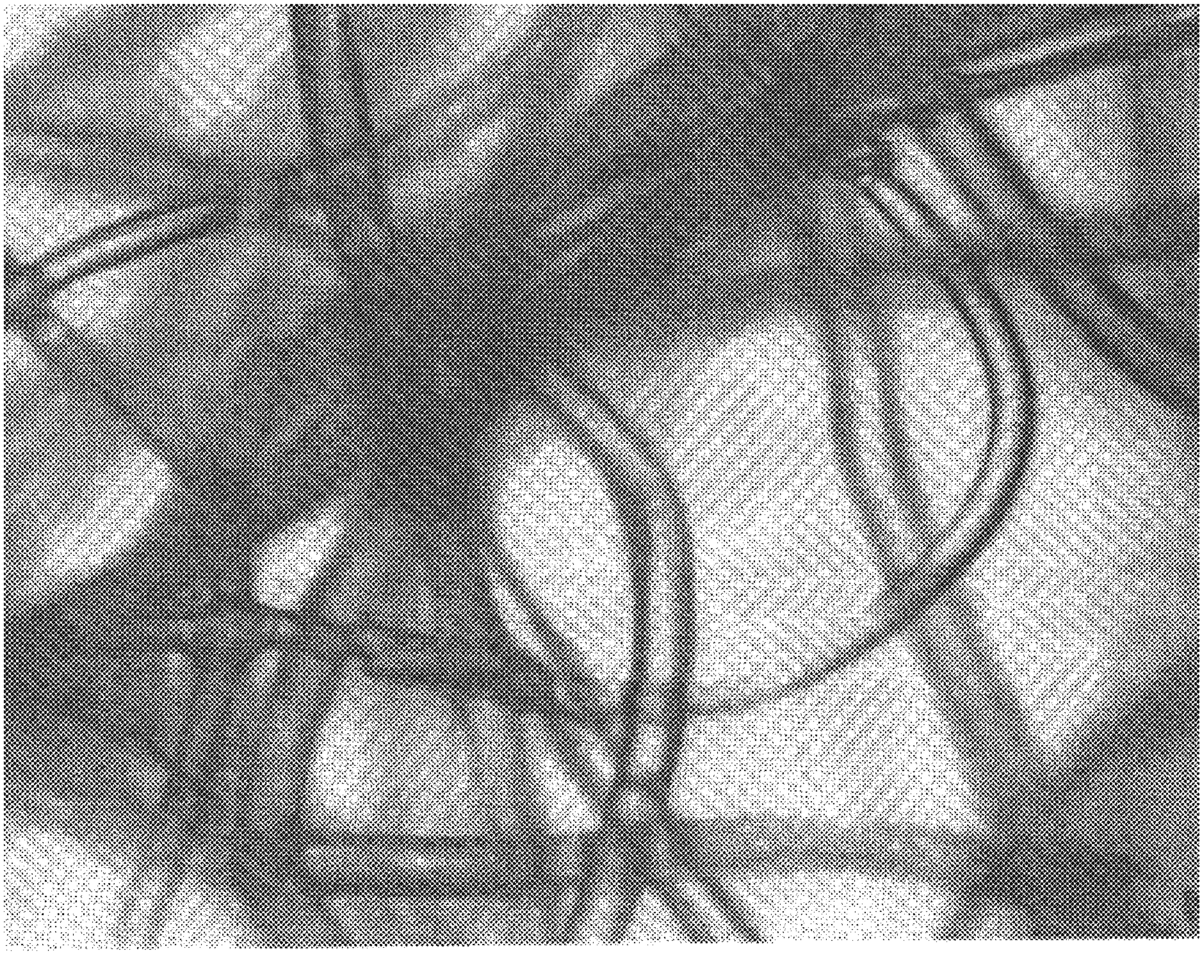
FIG. 12 shows an SEM of intermeshed stable fibers from adjacent pleats of the composite web of FIG. 1. Fiber entanglement is apparent.

Two composite webs made other than in accordance with the present invention, as shown in FIGS. 9 and 10, and a prior art electret fiber filter sold under the brand name FILTRETE®, (Minnesota Mining and Manufacturing Company, St. Paul, Minn.) were obtained. The composite web of FIG. 9 was a pleated three layer composite web in which a meltblown PP web 2 having a basis weight of 25 gm/m$^2$ was laminated to top and bottom layers of a carded staple fiber web 1 made of 75% 6.7 dtex PP and 25% 5.5 dtex PE. The composite web of FIG. 10 differs from that of FIG. 9 in lacking the top staple fiber web layer. Because the frequency of pleats along the length of the FIG. 9 and 10 composite webs was low, it was necessary to bond the pleated composites to either a scrim (FIG. 9, numeral 3) or a needle-punched nonwoven (FIG. 10, numeral 3). The Filtrete filter was a commercially obtained pleated split film fiber PP web filter, designed for home central air systems, made of electrostatically charged (charged and pleated by the manufacturer) split film fiber.

These webs were compared with a three layer composite web of the invention, as shown in FIG. 1. The composite web of the invention contained a central meltblown PP nonwoven web having a stretched (unpleated) basis weight of 34.0 gm/m$^2$ and a pleated (unstretched) basis weight of 180 gm/m$^2$. Two staple fiber webs of a blend of 75% 6.7 dtex PP fibers and 25% bi-component fibers having a core of PP and a sheath of PE, were attached to top and bottom sides of the meltblown nonwoven web. The staple fiber webs had a basis weight of 17.7 gm/m$^2$ stretched and 96 gm/m$^2$ unstretched. The basis weight of the composite web, that is of the combined multilayer nonwoven and carded staple fiber web was 69.4 gm/m$^2$ stretched and 372 gm/m$^2$ unstretched.

The non-invention webs and the web of the invention were compared as to filtering efficiency and pressure drop, in both the charged and uncharged state, except that the Filtrete fiber, being charged by the manufacturer, was tested only in the charged state. The results are presented in Table I.

TABLE I

| Sample No. & Description | Control Eff. % | Control Press. Dp ($mmH_2O$) | Charged Filt. Eff. % | Charged Press. Dp ($mmH_2O$) |
|---|---|---|---|---|
| FIG. 9. Staple F.Web/MB/PP/Staple F.Web on Support Scrim Pleated Composite | 67.65 | 2.0 | 99.617 | 1.3 |
| FIG. 10. MB PP/Staple F.Web on Needle-Punched Support Nonwoven Pleated Composite | 69.9 | 1.7 | 99.839 | 1.65 |
| "Filtrete" Electret Fiber Filter for Home Central Air Systems (charged by producer) | — | — | 67.2 | 0.25 |
| FIG. 1. Stabilized Pleated Composite of Carded Staple F. Web/MB/PP/Carded Staple F. Web | 32.5 | 1.3 | 97.14 | 1.7 |

As is shown in Table I, Samples FIG. 9 and FIG. 10 had filtration efficiencies to 0.1 micrometer (μm) NaCl particles prior to electrostatic charging of 67.65 and 69.9%, respectively. This efficiency is higher than the 32.5% of Sample FIG. 1.

The lower filtration efficiency of the non-electrically charged Sample FIG. 1 was most likely due to the fact that, unlike Samples FIGS. 9 and 10, it lacked a supporting material. All three of Samples FIGS. 1, 9, and 10 showed a pressure drop, as determined using a TSI Model 8110 Filter Tester with a challenge aerosol of 0.1 micrometer neutralized NaCl particles at a flow rate of 32 l/min corresponding to a face velocity of 5.3 cm/sec, which was quite low with the average values ranging from only 1.3 to 2.0 mm. These pressure drop values compare to the commercial "Filtrete" pleated filter which had a pressure drop of only 0.25 mm.

The filtration efficiencies were tested under the same test conditions for Samples FIGS. 9, 10, and 1 to which a permanent electrostatic charge was added in accordance with the TANTRET™ method (TANDEC, Knoxville, Tenn.) which is described in U.S. Pat. No. 5,401,446. The Filtrete filter, having an electric charge applied by the manufacturer, was likewise tested for filtration efficiency. The filtration efficiencies of Samples FIGS. 9, 10, and 1 were much higher than their respective uncharged counterparts, at 99.617, 99.839 and 97.14%, respectively, and the filtration efficiency of Filtrete was only 67.2%.

Although the filtration efficiency obtained with the new inventive sample was slightly lower than Samples FIGS. 9 and 10, Sample FIG. 1 had the greatest improvement between the non-charged and electrostatically charged composites. Moreover, the high filtration efficiency of Sample FIG. 1 of the invention was achieved without the use of a base supporting nonwoven or scrim, which significantly adds to the filtration efficiency of a filter.

The above description and example fully disclose the present invention, including preferred embodiments thereof. The invention, however, is not intended to be limited to the precise embodiments described herein but includes all modifications encompassed within the scope and spirit of the following claims.

What is claimed is:

1. A pleated web comprising a layer of a staple fiber web, wherein the staple fibers from the pleats are thermally fused or interlocked with the staple fibers of adjacent pleats.

2. The pleated web of claim 1 which further comprises a layer of a nonwoven web attached to the staple fiber web layer.

3. The pleated web of claim 2 which comprises a layer of staple fiber web on both sides of the nonwoven web layer.

4. The pleated web of claim 2 wherein the pleats are micropleats of the staple fiber web.

5. The pleated web of claim 2 wherein the pleats are macropleats of the staple fiber and nonwoven webs.

6. The pleated web of claim 5 which further comprises micropleats of the staple fiber web.

7. The pleated web of claim 1 wherein the staple fibers are selected from the group consisting of polypropylene (PP), polyethylene terephthalate (PET), polyethylene (PE), polybutylene terephthalate (PBT), polycylohexyldimethylene terephthalate (PCT), polycarbonates, and polychlorotrifluoroethylene (PCTFE), poly[4-methylpentene-1] (TPX), cotton, wool, cellulosic fibers, and wood tissue.

8. The pleated web of claim 2 wherein the nonwoven web comprises fibers selected from the group consisting of polypropylene (PP), polyethylene terephthalate (PET), polyethylene (PE), polybutylene terephthalate (PBT), polycyclohexyldimethylene terephthalate (PCT), polycarbonates, and polychlorotrifluoroethylene (PCTFE), cotton, wool, cellulosic fibers, and wood tissue.

9. The pleated web of claim 2 wherein the nonwoven web is a meltblown or spunbond nonwoven web.

10. The pleated web of claim 1 which has an electrostatic charge on the surface of the staple fibers.

11. The pleated web of claim 2 which has an electrostatic charge on the surface of the staple fibers.

12. The pleated web of claim 1 which further comprises a supporting nonwoven or scrim.

13. The pleated web of claim 2 which further comprises a supporting nonwoven or scrim.

14. The pleated web of claim 2 which comprises an adhesive between the staple fiber web and the nonwoven web layers.

15. A composite web comprising a first layer of a staple fiber web and a second layer of a non-woven web wherein the staple fibers are static electrically charged.

16. The composite web of claim 15 which comprises a layer of staple fiber web on both sides of the nonwoven web layer.

17. The composite web of claim 15 which is pleated.

18. The composite web of claim 17 wherein the pleats are micropleats.

19. The composite web of claim 17 wherein the pleats are macropleats.

20. The composite web of claim 17 wherein the pleats are micropleats and macropleats.

21. A composite heat stabilized web comprising at least two layers including a staple fiber web and a nonwoven web, which composite web has a series of pleats, wherein, prior to heat stabilization, surfaces of the staple fibers have static electrical charges, which static electrical charge enhances commingling of staple fibers in adjacent pleats, which commingling is fixed by the heat stabilization.

22. The composite web of claim 21 wherein the commingling is mechanical interlocking or fusion of the fibers.

23. The composite web of claim 21 wherein the commingling is mechanical interlocking and fusion of the fibers.

* * * * *